United States Patent
Ogiwara et al.

(10) Patent No.: US 12,556,123 B2
(45) Date of Patent: Feb. 17, 2026

(54) MOTOR CONTROL DEVICE, ELECTRIC POWER STEERING DEVICE, AND MOTOR CONTROL METHOD

(71) Applicant: Mitsubishi Electric Corporation, Tokyo (JP)

(72) Inventors: Kento Ogiwara, Tokyo (JP); Chiaki Fujimoto, Tokyo (JP); Seiji Sawada, Tokyo (JP); Yuta Maeda, Kobe (JP); Motohiro Norikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 146 days.

(21) Appl. No.: 18/290,101

(22) PCT Filed: Jul. 9, 2021

(86) PCT No.: PCT/JP2021/025897
§ 371 (c)(1),
(2) Date: Nov. 9, 2023

(87) PCT Pub. No.: WO2023/281727
PCT Pub. Date: Jan. 12, 2023

(65) Prior Publication Data
US 2024/0313689 A1    Sep. 19, 2024

(51) Int. Cl.
*H02P 29/024* (2016.01)
*B62D 5/04* (2006.01)
*H02P 29/028* (2016.01)

(52) U.S. Cl.
CPC ........ *H02P 29/0243* (2016.02); *H02P 29/028* (2013.01); *B62D 5/046* (2013.01)

(58) Field of Classification Search
CPC ... H02P 29/0243; H02P 29/028; B62D 5/046; B62D 5/0487

(Continued)

(56) References Cited

U.S. PATENT DOCUMENTS 9,130,489 B2 *   9/2015   Kitano ............... H02P 6/12
9,771,099 B2 *   9/2017   Mori ............... H02P 29/032

(Continued)

FOREIGN PATENT DOCUMENTS

| JP | 5181579 B2 | 4/2013 |
| JP | 2019-187187 A | 10/2019 |
| JP | 2019-221089 A | 12/2019 |

OTHER PUBLICATIONS

Extended European Search Report issued Jul. 25, 2024 in European Application No. 21949360.8.

*Primary Examiner* — David Luo
(74) *Attorney, Agent, or Firm* — Sughrue Mion, PLLC

(57) ABSTRACT

A motor control device includes: a motor driver that supplies electric power to a motor having windings of plural phases, the motor driver including, for each phase, an upper drive element and a lower drive element connected in series; a motor terminal voltage detector that detects a motor terminal voltage value based on a voltage of a motor terminal for each phase of the motor; a drive element fault determinator that performs fault determination for the upper drive elements and the lower drive elements, based on a voltage value across each drive element, and outputs a result of the fault determination; and a short/open-circuit fault determinator that, when the result of the fault determination indicates that there is a fault, determines whether the fault is a short-circuit fault or an open-circuit fault, for the upper drive elements and the lower drive elements, based on the motor terminal voltage value.

18 Claims, 4 Drawing Sheets

(58) Field of Classification Search
USPC ................ 318/434, 400.26, 400.01, 700
See application file for complete search history.

(56) References Cited

U.S. PATENT DOCUMENTS

| | | | |
|---|---|---|---|
| 9,889,880 B2* | 2/2018 | Mori | ................ B60L 3/12 |
| 2016/0325777 A1 | 11/2016 | Mori | |
| 2019/0319573 A1 | 10/2019 | Maeshima | |
| 2019/0393825 A1 | 12/2019 | Maeshima et al. | |
| 2020/0028463 A1 | 1/2020 | Suzuki et al. | |

* cited by examiner

MOTOR CONTROL DEVICE, ELECTRIC POWER STEERING DEVICE, AND MOTOR CONTROL METHOD

TECHNICAL FIELD

The present disclosure relates to a motor control device, an electric power steering device, and a motor control method.

This application is a U.S. national stage application of International Application No. PCT/JP2021/025897, filed on Jul. 9, 2021, the contents of which are incorporated herein by reference.

BACKGROUND ART

An electric power steering device that applies a steering assist force to a steering mechanism of a vehicle such as an automobile includes a motor that generates a steering assist torque to a steering wheel and a motor control device that controls the motor. The electric power steering device is constantly operating while the vehicle is running. Therefore, when a component that drives the motor fails during operation, the electric power steering device needs to identify the faulty component, and depending on the details of the fault, perform a control such as stopping or continuing the assist operation.

Techniques for conventional electric power steering devices to monitor and determine faults in drive elements of an inverter circuit that drives a motor are known (see, for example, Patent Documents 1 and 2).

CITATION LIST

Patent Document

[Patent Document 1] Japanese Patent Application Publication No. 2019-221089
[Patent Document 2] Japanese Patent Application Publication No. 2019-187187

SUMMARY OF THE INVENTION

Problems to be Solved by the Invention

However, the technique described in Patent Document 1 requires that a comparator that compares a motor terminal voltage, which is a voltage of a motor terminal, with a predetermined value be provided for each phase signal for driving the motor, thereby causing a problem of complicating the configuration.

Further, the technology described in Patent Document 2 assumes that a pre-driver IC (Integrated Circuit) having a monitoring function is used for each drive element, thereby causing a problem of complicating the configuration.

As described above, it has been difficult for the above-described conventional electric power steering devices to diagnose faults in drive elements with a simple configuration.

The present disclosure has been made to solve the above problems, and an object thereof is to provide a motor control device, an electric power steering device, and a motor control method capable of diagnosing faults in drive elements with a simple configuration.

Means for Solving the Problems

To solve the above-described problems, an aspect of the present disclosure is a motor control device including: a motor driver configured to supply electric power to a motor having windings of a plurality of phases, the motor driver including, for each phase of the plurality of phases, an upper drive element and a lower drive element which are connected in series; a motor terminal voltage detector configured to detect a motor terminal voltage value based on a voltage of a motor terminal for each phase of the motor; a drive element fault determinator configured to perform fault determination for the upper drive elements and the lower drive elements, based on a voltage value across each drive element, and output a result of the fault determination; and a short/open-circuit fault determinator configured to, when the result of the fault determination output by the drive element fault determinator indicates that there is a fault, determine whether the fault is a short-circuit fault or an open-circuit fault, for the upper drive elements and the lower drive elements, based on the motor terminal voltage value detected by the motor terminal voltage detector.

Further, an aspect of the present disclosure is an electric power steering device including: the motor control device described above; the a motor configured to assist steering of a steering device; and a torque sensor configured to detect a steering torque of the steering device. The motor control device is configured to control driving of the motor according to the steering torque detected by the torque sensor.

Further, an aspect of the present disclosure is a motor control method for a motor control device, including: supplying electric power from a motor driver to a motor having windings of a plurality of phases, the motor driver including, for each phase of the plurality of phases, an upper drive element and a lower drive element which are connected in series; detecting a motor terminal voltage value based on a voltage of a motor terminal for each phase of the motor; performing fault determination for the upper drive elements and the lower drive elements, based on a voltage value across each drive element; outputting a result of the fault determination; and, when the result of the fault determination indicates that there is a fault, determining whether the fault is a short-circuit fault or an open-circuit fault, for the upper drive elements and the lower drive elements, based on the motor terminal voltage value.

Effects of the Invention

According to the present disclosure, it is possible to diagnose faults in the drive elements with a simple configuration.

MODE FOR CARRYING OUT THE INVENTION

Hereinafter, a motor control device and an electric power steering device according to an embodiment of the present disclosure will be described with reference to the drawings.

Figure 1:
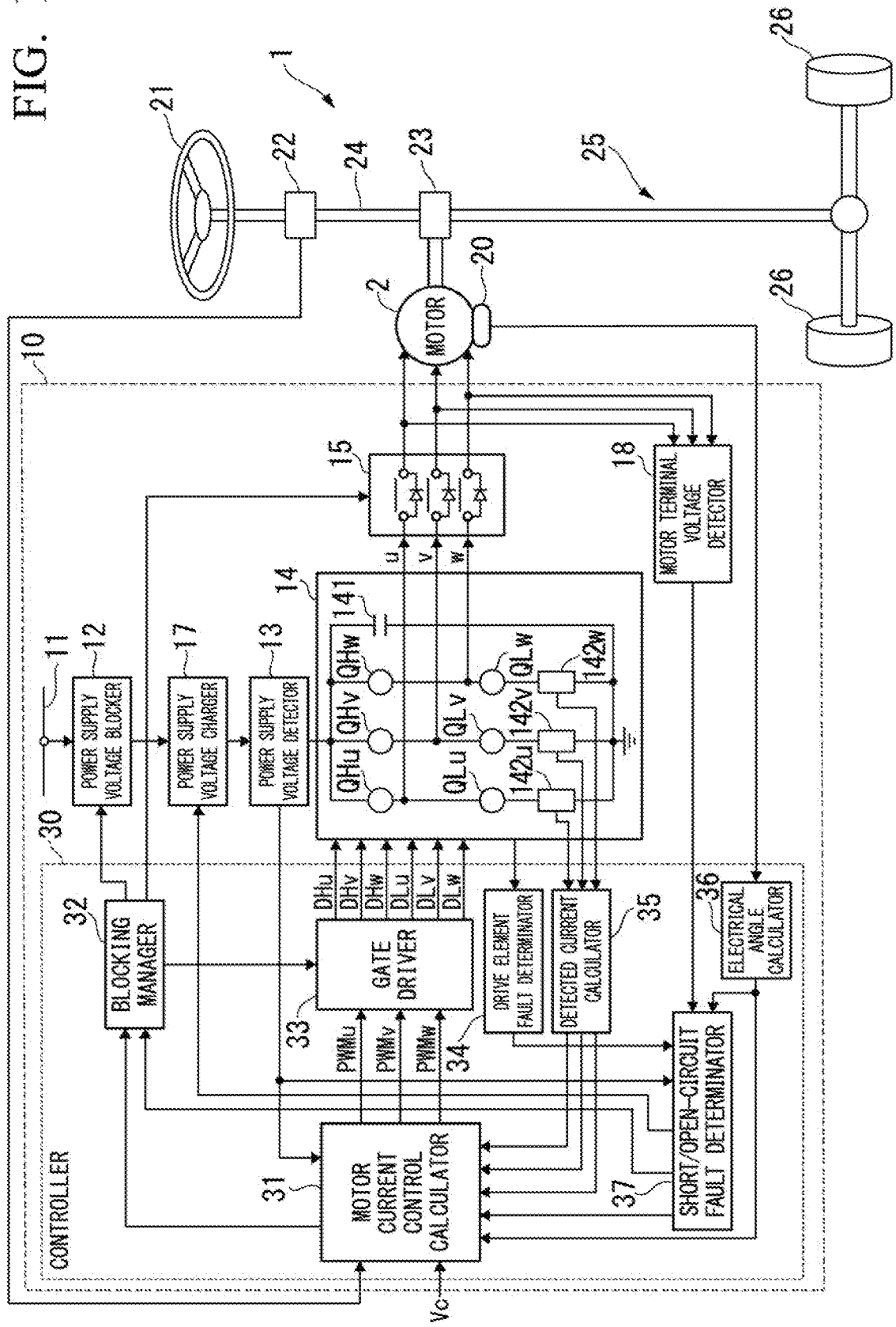
FIG. 1 is a block diagram showing an example of an electric power steering device according to the present embodiment.

FIG. 1 is a block diagram showing an example of an electric power steering device 1 according to the present embodiment.

As shown in FIG. 1, the electric power steering device 1 includes a motor 2, a motor control device 10, an angle detector 20, a steering wheel 21, a torque sensor 22, a driving force transmission mechanism 23, a shaft 24, and a steering device 25.

The motor 2 is a rotating electric machine having multi-phase windings (for example, three-phase windings) and functions as a driving force source that assists steering of a steering (steering device 25). The motor 2 includes a stator (not shown) provided with the multi-phase windings, and a rotor (not shown) provided with magnets arranged radially inside the stator. In the present embodiment, the magnet is, for example, a permanent magnet. The motor 2 is, for example, a permanent magnet synchronous rotating electric machine. Here, the magnet may be an electromagnet having a field winding. In addition, the three-phase windings may be star-connected or delta-connected.

The angle detector 20 is, for example, a rotation sensor such as a resolver, an encoder, or an MR sensor. The angle detector 20 is provided on the rotor and detects a rotation angle of the rotor. The angle detector 20 detects the rotation angle of the rotor. The angle detector 20 outputs to an electrical angle calculator 36 of the motor control device 10, which will be described later.

The steering device 25 is, for example, a steering device for steering a vehicle such as an automobile. The steering device 25 transmits a steering torque from the steering wheel 21 to wheels 26.

The steering wheel 21 is rotated left and right by a driver to steer a vehicle such as an automobile.

The torque sensor 22 is attached to the shaft 24 and detects a steering torque of the steering wheel 21. The torque sensor 22 outputs the detected steering torque to a motor current control calculator 31 of the motor control device 10.

The driving force transmission mechanism 23 is connected to a rotating shaft of the rotor of the motor 2 and transmits the driving force of the motor 2 to the steering device 25 of the vehicle. The driving force transmission mechanism 23 is, for example, a worm gear mechanism or the like that connects the rotating shaft of the motor 2 to the shaft 24.

The shaft 24 is connected to the steering wheel 21 and transmits the steering torque from the steering wheel 21 to the steering device 25.

The motor control device 10 controls driving of the motor 2 according to the steering torque detected by the torque sensor 22. The motor control device 10 includes a DC power supply 11, a power supply voltage blocker 12, a power supply voltage detector 13, a motor driver 14, a motor drive current blocker 15, a power supply voltage charger 17, a motor terminal voltage detector 18, and a controller 30.

The motor driver 14 is, for example, an inverter circuit that generates from the DC power supply 11, AC signals (AC power) for driving the motor 2. The motor driver 14 supplies power to the motor 2. The motor driver 14 includes positive electrode side drive elements (QHu, QHv, QHw), negative electrode side drive elements (QLu, QLv, QLw), a smoothing capacitor 141, and current sensors (142u, 142v, 142w).

The motor driver 14 includes three sets of series circuits for the three respective phases. In each set of series circuits, the positive electrode side drive element (QHu, QHv, QHw) connected to a positive electrode side of the DC power supply 11 via the power supply voltage blocker 12 and the power supply voltage detector 13, and the negative electrode side drive element (QLu, QLv, QLw) connected to a negative electrode side of the DC power supply 11 are connected in series. Here, the positive electrode side drive elements (QHu, QHv, QHw) correspond respectively to upper arm drive elements (upper drive elements), and the negative electrode side drive elements (QLu, QLv, QLw) correspond respectively to lower arm drive elements (lower drive elements).

Note that in the present embodiment, each of the upper arm drive elements (QHu, QHv, QHw) will be described as a drive element QH, when referring to any upper arm drive element included in the motor driver 14 or when not particularly distinguished. Further, each of the lower arm drive elements (QLu, QLv, QLw) will be described as a drive element QL, when referring to any lower arm drive element included in the motor driver 14 or when not particularly distinguished. Further, each of the drive element QH and the drive element QL will be described as a drive element Q when referring to any drive element included in the motor driver 14 or when not particularly distinguished.

In the motor driver 14, a connection point of the two drive elements (the drive element QH and the drive element QL) in the series circuit for each phase is connected to the winding for the corresponding phase of the motor 2 via the motor drive current blocker 15.

Specifically, in a U-phase series circuit, a U-phase upper arm drive element QHu and a U-phase lower arm drive element QLu are connected in series, and a connection point of the two drive elements (QHu and QLu) is connected to a U-phase winding of the motor 2 via the motor drive current blocker 15.

Further, in a V-phase series circuit, a V-phase upper arm drive element QHv and a V-phase lower arm drive element QLv are connected in series, and a connection point of the two drive elements (QHv and QLv) is connected to a V-phase winding of the motor 2 via the motor drive current blocker 15.

Further, in a W-phase series circuit, a W-phase upper arm drive element QHw and a W-phase lower arm drive element QLw are connected in series, and a connection point of the two drive elements (QHw and QLw) is connected to a W-phase winding of the motor 2 via the motor drive current blocker 15.

The smoothing capacitor 141 is connected between the positive side of the DC power supply 11 via the power supply voltage blocker 12 and the power supply voltage detector 13 and the negative side of the DC power supply 11. The smoothing capacitor 141 smoothes a power supply voltage of the DC power supply 11 via the power supply voltage blocker 12 and the power supply voltage detector 13.

The drive elements Q are, for example, semiconductor switching elements such as MOSFETs (Metal-Oxide-Semiconductor Field Effect Transistors). A drive signal is supplied from a gate driver 33 to a gate terminal of each drive element Q of the upper arm drive elements (QHu, QHv, QHw) and the lower arm drive elements (QLu, QLv, QLw). Each drive element Q is driven by a drive signal (DHu, DHv, DHw, DLu, DLv, DLw) output from the gate driver 33, thereby applying a predetermined phase voltage to a respective phase coil (respective phase winding) of the motor 2 via the subsequent motor drive current blocker 15. As a result, each drive element Q causes a predetermined drive current to flow through the motor 2, causing the motor 2 to generate torque.

The current sensors (142u, 142v, 142w) are, for example, sensors such as shunt resistors or Hall elements, and each current sensor detects a current flowing through a respective phase winding. The current sensor 142*u* is connected in series with the lower arm drive element QLu and detects a current flowing through the U-phase winding. Further, the current sensor 142*v* is connected in series with the lower arm drive element QLv and detects a current flowing through the V-phase winding. Further, the current sensor 142*w* is connected in series with the lower arm drive element QLw and detects a current flowing through the W-phase winding.

The DC power supply 11 supplies a DC voltage Vdc to the motor driver 14. In the present embodiment, the DC voltage Vdc is, for example, 12V. In addition, the DC power supply 11 may be any device such as a battery, a DC-DC converter, a diode rectifier, or a PWM rectifier, as long as it outputs the DC voltage Vdc.

The power supply voltage blocker 12 blocks the DC voltage of the DC power supply 11 to be applied to the motor driver 14 in accordance with a power supply voltage blocking command from a blocking manager 32, which will be described later. That is, the power supply voltage blocker 12 blocks the power supply voltage to be applied to the motor driver 14.

The power supply voltage detector 13 detects a voltage of the DC power supply 11. The power supply voltage detector 13 outputs a value of the detected voltage of the DC power supply 11 to the motor current control calculator 31 and a short/open-circuit fault determinator 37, which will be described later.

The power supply voltage charger 17 forcibly applies a voltage to the motor driver 14 when fault determination processing for the upper arm drive elements QH is performed. The power supply voltage charger 17 applies the voltage by charging the smoothing capacitor 141 in order to keep constant the voltage applied to the motor driver 14, which decreases over time when the power supply voltage is blocked by the power supply voltage blocker 12. Here, the power supply voltage charger 17 operates only if the power supply voltage when the fault determination processing for the upper arm drive elements QH is performed is equal to or lower than a predetermined threshold. Further, if the motor control device 10 does not include the power supply voltage blocker 12, the motor control device 10 need not include the power supply voltage charger 17.

The motor drive current blocker 15 includes switching elements each of which includes a parasitic diode and blocks the power supply from the motor driver 14 to a respective phase of the motor 2. The motor drive current blocker 15 is arranged between each phase output line of the motor driver 14 and a respective phase terminal of the motor 2, and blocks a drive current that is an output of the motor driver 14 in accordance with the motor drive current blocking command from the blocking manager 32.

The switching elements included in the motor drive current blocker 15 are, for example, FETs, and the parasitic diodes are arranged in a forward direction from each phase output line of the motor driver 14 toward the respective phase terminal of the motor 2.

The motor terminal voltage detector 18 detects a motor terminal voltage value based on a voltage of the motor terminal for each phase of the motor 2. Here, the motor terminal voltage value is a voltage value obtained by combining terminal voltages of respective phase coils (respective phase windings) of the motor 2. For example, the motor terminal voltage value is a total value, an average value, or the like of the terminal voltages of the respective phase coils (respective phase windings).

The motor terminal voltage detector 18 is realized by, for example, a CPU (Central Processing Unit) having an AD converter (analog-digital converter), and performs, by the CPU, predetermined arithmetic processing or the like for each voltage value detected by the AD converter to output the motor terminal voltage value. Here, it is assumed that the motor terminal voltage detector 18 is an interface between hardware and software in the motor control device 10, and includes the AD converter of the CPU. For example, using the AD converter, the motor terminal voltage detector 18 detects, as the motor terminal voltage value, a voltage value of a signal line obtained by combining signal lines connected to the motor terminals for the respective phases into one (the total value of the terminal voltages of the respective phase coils).

Further, settings are required such that a measurable upper limit of the motor terminal voltage value is lower than the voltage value of the DC power supply 11, and the motor terminal voltage value when the motor 2 is normally driven is a value with sufficient margin relative to the measurable upper limit value.

The controller 30 is realized by, for example, a processor including a CPU, a pre-driver IC, or the like, and performs various processes for controlling the motor 2. The controller 30 includes the motor current control calculator 31, the blocking manager 32, the gate driver 33, a drive element fault determinator 34, a detected current calculator 35, the electrical angle calculator 36, and the short/open-circuit fault determinator 37.

The detected current calculator 35 calculates phase currents (Iu, Iv, Iw) flowing in the respective phases of the motor 2, from output signals of the current sensors (142*u*, 142*v*, 142*w*) of the motor driver 14. As the phase currents (Iu, Iv, Iw) flowing in the respective phases, for example, the detected current calculator 35 calculates, using amplifiers, potential differences across shunt resistors which are the current sensors (142*u*, 142*v*, 142*w*), and outputs the calculated phase currents (Iu, Iv, Iw) flowing in the respective phases to the motor current control calculator 31.

The electrical angle calculator 36 calculates an electrical angle based on the rotation angle of the rotor detected by the angle detector 20. The electrical angle calculator 36 outputs the calculated electrical angle to the motor current control calculator 31.

The motor current control calculator 31 is an example of a motor controller that outputs drive command values to the gate driver 33 to control the driving of the motor 2. The motor current control calculator 31 obtains the steering torque output from the torque sensor 22, vehicle speed information Vc output from an external device, and the electrical angle output from the electrical angle calculator 36. Further, the motor current control calculator 31 calculates a motor rotation speed based on the obtained electrical angle. Based on the steering torque, the vehicle speed information Vc, the electrical angle, and the motor rotation speed, the motor current control calculator 31 calculates a q-axis current command Iq_t and a d-axis current command Id_t, which are current commands on two rotation axes (d-q axes). Further, the motor current control calculator 31 generates detected phase currents (Iq_m, Id_m) by three-phase two-axis transformation that transforms the respective phase currents (Iu, Iv, Iw) output by the detection current calculator 35 into currents on the two rotation axes (d-q axes).

Based on the calculated q-axis current command Iq_t, the calculated d-axis current command Id_t, and the detected phase currents (Iq_m, Id_m), the motor current control calculator 31 performs known control calculation processing (for example, PI (Proportional Integral) control processing) to generate a U-phase PWM signal, a V-phase PWM signal, and a W-phase PWM signal, as results of the calculation processing. The motor current control calculator 31 outputs the generated U-phase PWM signal, V-phase PWM signal, and W-phase PWM signal to the subsequent gate driver 33.

Further, the motor current control calculator 31 stops the driving of the motor 2 when a result of short/open-circuit fault determination output from the short/open-circuit fault determinator 37 described later indicates that the drive elements Q have a short-circuit fault. That is, when it is determined that the drive elements Q have a short-circuit fault, regardless of the q-axis current command Iq_t, the d-axis current command Id_t, and the detected phase currents (Iq_m, Id_m) described above, the motor current control calculator 31 generates a U-phase PWM signal, a V-phase PWM signal, and a W-phase PWM signal so that a current is not applied to each phase of the motor 2, and outputs the generated PWM signals to the subsequent gate driver 33.

Further, the motor current control calculator 31 performs faulty phase identification processing, and motor control processing by the other phases than the faulty phase, when it is determined that both the upper arm drive elements QH and the lower arm drive elements QL have open-circuit faults. When it is determined that there is an open-circuit fault, the motor current control calculator 31 identifies a faulty phase. When the faulty phase is one, the motor current control calculator 31 stops the driving of the motor 2, and drives the motor 2 by the other phases than the faulty phase.

The gate driver 33 is, for example, a pre-driver IC for the drive elements, and based on each phase PWM signal (U-phase PWM signal, V-phase PWM signal, W-phase PWM signal) output by the motor current control calculator 31, outputs a drive signal for driving the respective drive element Q of the motor driver 14. As the drive signals for driving the upper arm drive elements QH, the gate driver 33 outputs a drive signal DHu for driving the drive element QHu, a drive signal DHv for driving the drive element QHv, and a drive signal DHw for driving the drive element QHw. As the drive signals for driving the lower arm drive elements QL, the gate driver 33 outputs a drive signal DLu for driving the drive element QLu, a drive signal DLv for driving the drive element QLv, and a drive signal DLw for driving the drive element QLw.

The blocking manager 32 puts the motor drive current blocker 15 and the power supply voltage blocker 12 into a blocked state, in response to a blocking command from the short/open-circuit fault determinator 37. For example, in response to blocking commands from the motor current control calculator 31 and the short/open-circuit fault determinator 37, the blocking manager 32 outputs blocking commands to the power supply voltage blocker 12 and the motor drive current blocker 15. Further, in response to a command to stop driving the motor 2 from the motor current control calculator 31, the blocking manager 32 also outputs a drive stop command to the gate driver 33.

The drive element fault determinator 34 performs fault determination for the upper arm drive elements QH and the lower arm drive elements QL, based on a voltage value (potential difference) across each drive element Q of the motor driver 14, and outputs a result of the fault determination. That is, the drive element fault determinator 34 monitors two voltages which are a voltage between a high potential side terminal and a low potential side terminal of each upper arm drive element QH of the motor driver 14 (the voltage value between both ends) and a voltage between a high potential side terminal and a low potential side terminal of each lower arm drive element QL. When a period during which these voltages are not within a normal threshold voltage range is equal to or longer than a predetermined period, the drive element fault determinator 34 determines that the drive elements Q have a fault, and outputs a result of the drive element fault determination.

Specifically, the drive element fault determinator 34 determines that the upper arm drive elements QH have a fault, when a period during which a voltage value across each upper arm drive element QH is not within a predetermined normal voltage range is equal to or longer than a predetermined period, while the upper arm drive elements QH are controlled to be in an on-state (conducting state). Further, the drive element fault determinator 34 determines that the lower arm drive elements QL have a fault, when a period during which a voltage value across each lower arm drive element QL is not within a predetermined normal voltage range is equal to or longer than a predetermined period, while the lower arm drive elements QL are controlled to be in the conducting state.

Here, the drive element fault determinator 34 performs the fault determination at predetermined intervals before the motor 2 is driven and while the motor 2 is being driven.

Here, when the voltage between the high potential side terminal and the low potential side terminal (the voltage value between both ends) of each drive element Q being driven by the drive command from the gate driver 33 does not fall within the normal threshold voltage range and is an abnormally high value, a current larger than that which normally flows will flow. In this case, it can be determined that the drive elements Q have a short-circuit fault.

Further, when the voltage between the high potential side terminal and the low potential side terminal (the voltage value between both ends) of each drive element Q being driven by the drive command from the gate driver 33 does not fall within the normal threshold voltage range and is an abnormally low value, it can be determined that the drive elements Q have an open-circuit fault.

Here, as a result of the fault determination by the drive element fault determinator 34, the result of the fault determination for the upper arm drive elements QH and the result of the fault determination for the lower arm drive elements QL are collectively output. Further, the process of determining which of the upper arm drive elements QH and the lower arm drive elements QL have a fault and the process of determining a faulty phase are performed by the short/open-circuit fault determinator 37. In addition, the voltage monitoring described above can be performed constantly while the motor is driven.

Alternatively, as a result of the fault determination, the drive element fault determinator 34 may be configured to separately output the result of the fault determination for the upper arm drive elements QH and the result of the fault determination for the lower arm drive elements QL. In this case, there is no need for the short/open-circuit fault determinator 37 to perform the process of determining which of the upper arm drive elements QH and the lower arm drive elements QL have a fault.

When the result of the fault determination output by the drive element fault determinator 34 indicates that there is a fault, the short/open-circuit fault determinator 37 determines whether the fault is a short-circuit fault or an open-circuit fault, for the upper arm drive elements QH and the lower arm drive elements QL, based on the motor terminal voltage value detected by the motor terminal voltage detector 18. Based on the result of the drive element fault determination output by the drive element fault determinator 34 and the motor terminal voltage value output by the motor terminal voltage detecting unit 18, the short/open-circuit fault determinator 37 performs fault determination processing for the upper arm drive elements QH and fault determination processing for the lower arm drive elements QL. The short/open-circuit fault determinator 37 outputs results of the determinations to the motor current control calculator 31.

In the fault determination processing for the upper arm drive elements QH, when a period during which the motor terminal voltage value is equal to or higher than an upper arm short-circuit fault determination threshold is equal to or longer than a predetermined period, the short/open-circuit fault determinator 37 determines that the upper arm drive elements QH have a short-circuit fault. In the fault determination processing for the upper arm drive elements QH, when determining that the upper arm drive elements QH have no short-circuit fault, the short/open-circuit fault determinator 37 determines that the upper arm drive elements QH have an open-circuit fault.

Further, in the fault determination processing for the lower arm drive elements QL, when a period during which the motor terminal voltage value is equal to or lower than a lower arm short-circuit fault determination threshold is equal to or longer than a predetermined period, the short/open-circuit fault determinator 37 determines that the lower arm drive elements QL have a short-circuit fault. In the fault determination processing for the lower arm drive elements QL, when determining that the lower arm drive elements QL have no short-circuit fault, the short/open-circuit fault determinator 37 determines that the lower arm drive elements QL have an open-circuit fault.

Here, when performing the fault determination processing, the short/open-circuit fault determinator 37 outputs via the blocking manager 32, the blocking commands to the power supply voltage blocker 12 and the motor drive current blocker 15 and the drive stop command to the gate driver 33. The short/open-circuit fault determinator 37 performs the determination processing for the upper arm drive elements QH, based on the motor terminal voltage value applied via the parasitic diodes while the motor drive current blocker 15 blocks the power supply to the motor 2.

Further, the short/open-circuit fault determinator 37 performs the determination processing for the lower arm drive elements QL, based on the motor terminal voltage value while the switching elements of the motor drive current blocker 15 are in the conducting state.

Further, the short/open-circuit fault determinator 37 performs the determination processing for the upper arm drive elements QH, when the detected voltage detected by the power supply voltage detector 13 is equal to or higher than a predetermined threshold, while the power supply voltage blocker 12 blocks the power supply voltage. When the detected voltage is lower than the predetermined threshold, the short/open-circuit fault determinator 37 causes the power supply voltage charger 17 to forcibly apply a voltage to the motor driver 14. Further, the short/open-circuit fault determinator 37 performs the determination processing for the upper arm drive elements QH when the detected voltage reaches the predetermined threshold within a predetermined period.

Further, when the detected voltage does not reach the predetermined threshold within the predetermined period, the short/open-circuit fault determinator 37 determines that the upper arm drive elements QH have a short-circuit fault.

Here, the short/open-circuit fault determinator 37 performs the determination processing for the lower arm drive elements QL after performing the determination processing for the upper arm drive elements QH. Further, when the short/open-circuit fault determinator 37 determines that the upper arm drive elements QH have a short-circuit fault, the short/open-circuit fault determinator 37 does not perform the determination processing for the lower arm drive elements QL.

Next, an operation of the motor control device 10 according to the present embodiment will be described with reference to the drawings.

Figure 2:
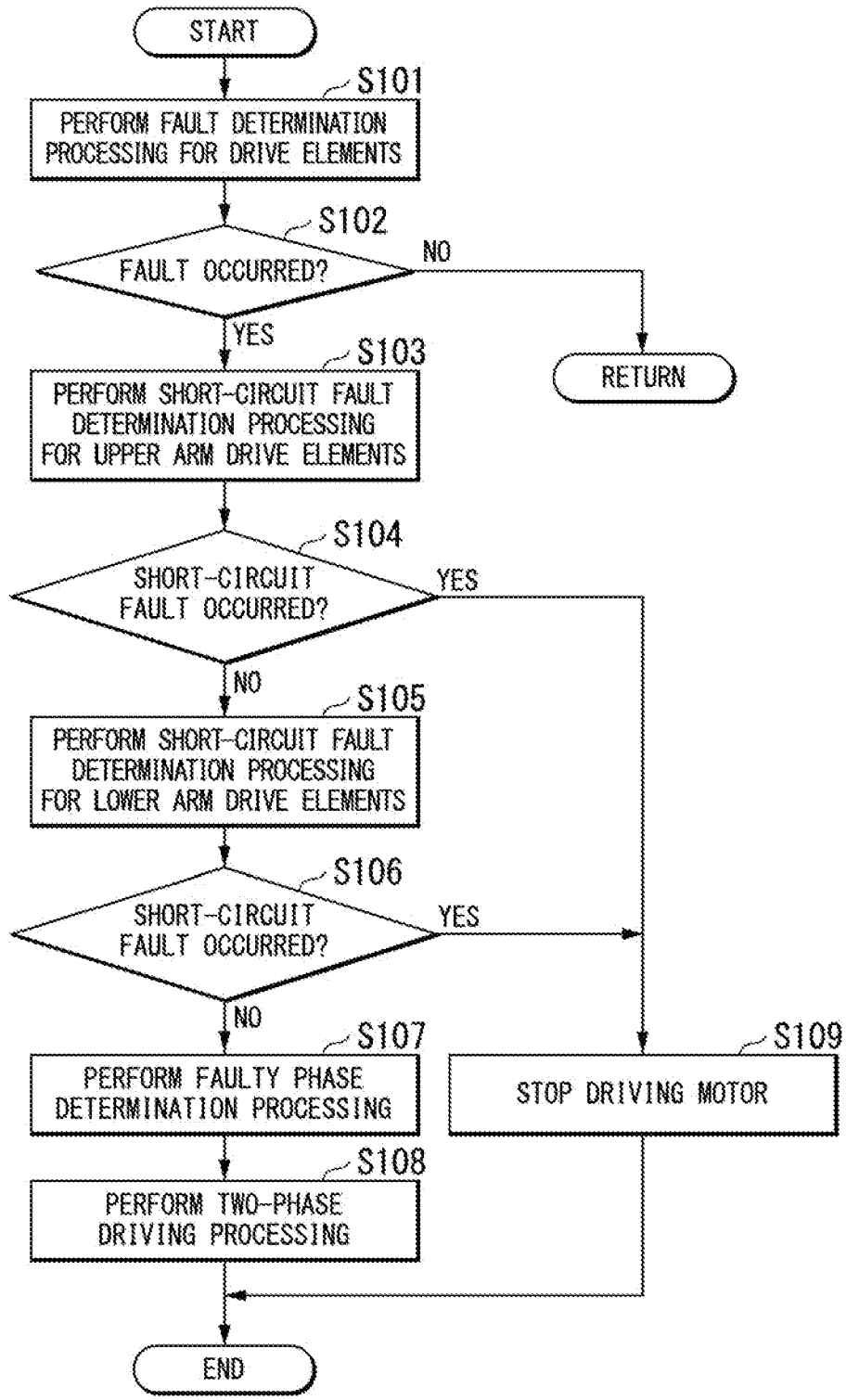
FIG. 2 is a flowchart showing an example of an operation of a motor control device according to the present embodiment.

FIG. 2 is a flowchart showing an example of the operation of the motor control device 10 according to the present embodiment. Here, fault monitoring processing and fault determination processing for the drive elements Q of the motor driver 14 by the motor control device 10 will be described.

As shown in FIG. 2, the drive element fault determinator 34 of the motor control device 10 first performs the fault determination processing for the drive elements Q (step S101). For example, when the high potential side terminals of the upper arm drive elements QH and the lower arm drive elements QL are in the on-state, the drive element fault determinator 34 monitors a drain-source voltage which is a voltage between the high potential side terminal and the low potential side terminal of each upper arm drive element QH, and a drain-source voltage which is a voltage between the high potential side terminal and the low potential side terminal of each lower arm drive element QL. When the voltage value between the terminals is not within a normal value range for a predetermined period, the drive element fault determinator 34 outputs a fault determination result indicating an occurrence of a fault in the drive elements Q.

Further, when the voltage value between the terminals is within the normal value range, the drive element fault determinator 34 outputs a fault determination result indicating a non-occurrence of a fault. Here, the normal value range for the voltage value between the terminals and the predetermined period used for determining an occurrence of a fault differ depending on the characteristics of the pre-driver IC and each drive element used. Further, the drive element fault determinator 34 constantly performs the fault determination processing for the drive elements Q while the motor is being driven.

Next, the short/open-circuit fault determinator 37 of the motor control device 10 determines whether or not a fault has occurred, based on the fault determination result of the fault determination processing for the drive elements (step S102). When the fault determination result indicates that a fault has occurred (step S102: YES), the short/open-circuit fault determinator 37 proceeds to step S103. Further, when the fault determination result indicates that a fault has not occurred (step S102: NO), the short/open-circuit fault determinator 37 ends the fault determination processing for the drive elements and returns to the normal processing of the motor control device 10.

In step S103, the short/open-circuit fault determinator 37 performs short-circuit fault determination processing for the upper arm drive elements QH. The short/open-circuit fault determinator 37 performs the short-circuit fault determination processing for the upper arm drive elements QH when the motor rotation speed becomes equal to or less than a predetermined rotation speed threshold while the power supply voltage is blocked by the power supply voltage blocker 12, the smoothing capacitor 141 is charged, and the voltage supplied to the motor deriver 14 is at a predetermined voltage value. The short/open-circuit fault determinator 37 performs the short-circuit fault determination processing for the upper arm drive elements QH, based on the motor terminal voltage value detected by the motor terminal voltage detector 18.

Here, the details of the short-circuit fault determination processing for the upper arm drive elements QH will be described later with reference to FIG. 3.

Then, the short/open-circuit fault determinator 37 determines whether or not a short-circuit fault has occurred (step S104). When a result of the short-circuit fault determination processing for the upper arm drive elements QH indicates that the upper arm drive elements QH have a short-circuit fault (step S104: YES), the short/open-circuit fault determinator 37 proceeds to step S109. Further, when the result of the short-circuit fault determination processing for the upper arm drive elements QH indicates that the upper arm drive elements QH have no short-circuit fault (step S104: NO), the short/open-circuit fault determinator 37 proceeds to step S105.

In step S105, the short/open-circuit fault determinator 37 performs short-circuit fault determination processing for the lower arm drive elements QL. Here, the details of the short-circuit fault determination processing for the lower arm drive elements QL will be described later with reference to FIG. 4.

Then, the short/open-circuit fault determinator 37 determines whether or not a short-circuit fault has occurred (step S106). When a result of the short-circuit fault determination processing for the lower arm drive elements QL indicates that the lower arm drive elements QL have a short-circuit fault (step S106: YES), the short/open-circuit fault determinator 37 proceeds to step S109. Further, when the result of the short-circuit fault determination processing for the lower arm drive elements QL indicates that the lower arm drive elements QL have no short-circuit fault (step S106: NO), the short/open-circuit fault determinator 37 proceeds to step S107.

Here, through the processes from step S103 to step S106, the short/open-circuit fault determinator 37 determines whether the upper arm drive elements QH have a short-circuit fault or an open-circuit fault, and also determines whether the lower arm drive elements QL have a short-circuit fault or an open-circuit fault.

In step S107, the motor current control calculator 31 of the motor control device 10 performs faulty phase determination processing. The motor current control calculator 31 first changes, via the blocking manager 32, the states of the power supply voltage blocker 12 and the motor drive current blocker 15 to the connected state, and the state of the gate driver 33 to the driven state. The motor current control calculator 31 outputs each phase PWM signal at a predetermined value, puts the motor into the motor driving state, and performs motor control.

Then, the motor current control calculator 31 determines an open-circuit faulty phase based on the electrical angle output by the electrical angle calculator 36, each phase current value output by the detected current calculator 35, and a duty value (duty value) of each phase PWM signal output by the motor current control calculator 31 or the calculation result obtained by the PI control process. Here, in the faulty phase determination processing, the motor current control calculator 31 may use any process as long as a faulty phase can be determined.

Then, the motor current control calculator 31 performs two-phase driving processing (step S108). The motor current control calculator 31 performs control for driving the motor by two phases other than the faulty phase. Here, as means for performing the two-phase driving processing, any process may be used as long as the motor can be driven by the remaining two phases other than the faulty phase. Further, the motor current control calculator 31 may put the motor drive current blocker 15 corresponding to the determined faulty phase into the blocked state. After the process of step S108, the motor control device 10 ends the fault determination processing.

Further, in step S109, the motor current control calculator 31 stops driving the motor. For example, the motor current control calculator 31 stops outputting each phase PWM signal. The motor current control calculator 31 outputs to the blocking manager 32, blocking commands for the power supply voltage blocker 12 and the motor drive current blocker 15 and a blocking drive stop command for the gate driver 33. As a result, the blocking manager 32 outputs the blocking commands to the power supply voltage blocker 12 and the motor drive current blocker 15, and outputs the drive stop command to the gate driver 33, thereby stopping the driving of the motor.

After the process of step S109, the motor control device 10 ends the fault determination processing.

As shown in FIG. 2, in the fault determination processing by the motor control device 10 according to the present embodiment, the drive element fault determinator 34 monitors the voltage between the high potential side terminal and the low potential side terminal of each upper arm drive element QH and each lower arm drive element QL, thereby determining that the drive elements Q of either arm have a fault. Then, using this determination result and the motor terminal voltage value detected by the motor terminal voltage detector 18, the short/open-circuit fault determinator 37 performs the processing of determining whether the fault is a short-circuit fault or an open-circuit fault, for the upper arm drive elements QH and for the lower arm derive elements QL. Here, the fault determination processing by the motor control device 10 according to the present embodiment is performed at predetermined intervals before the motor is driven and while the motor is being driven.

Next, the details of the processing in step S103 of FIG. 2 described above will be described with reference to FIG. 3.

Figure 3:
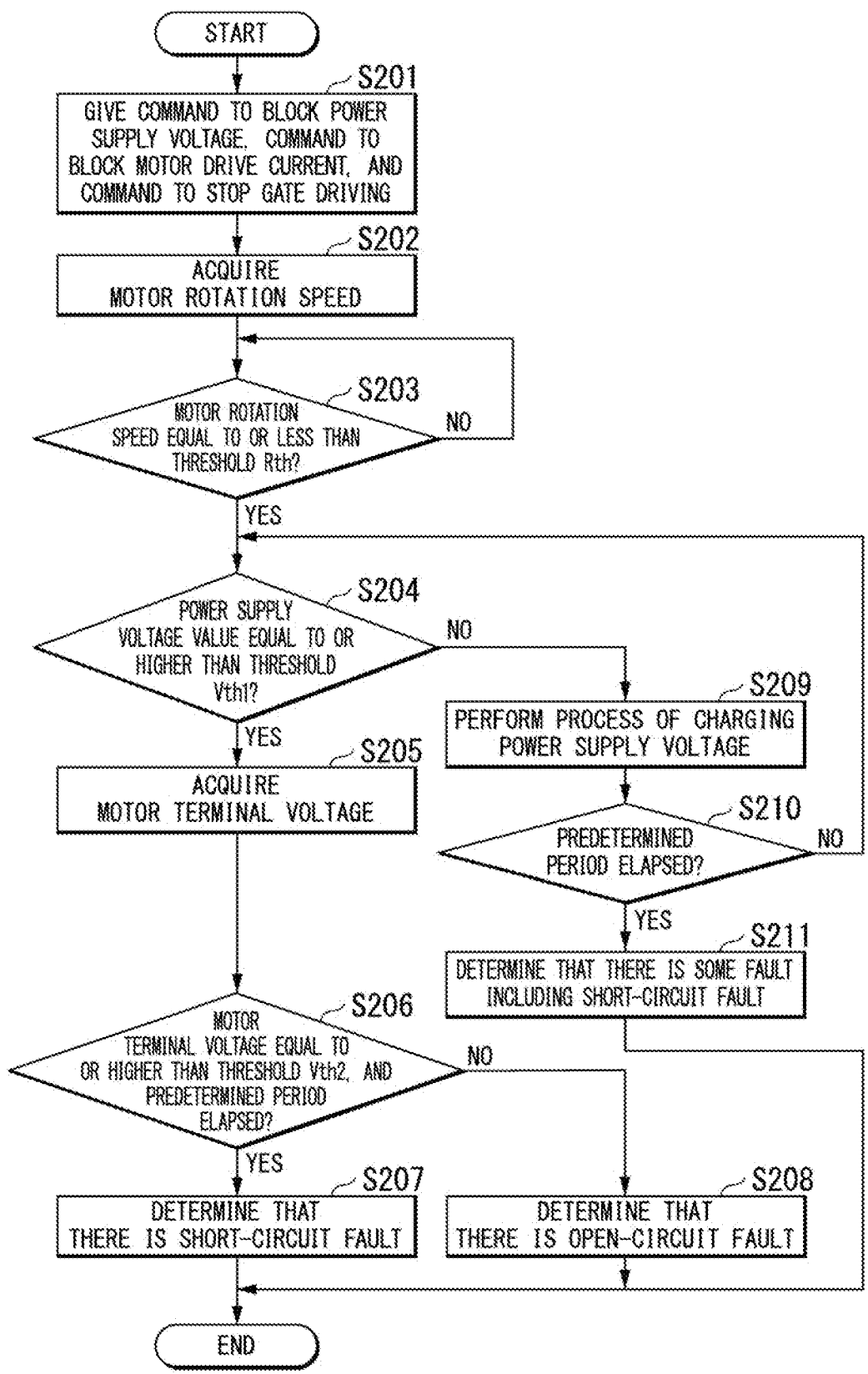
FIG. 3 is a flowchart showing an example of short/open-circuit fault determination processing for upper arm drive elements of the motor control device according to the present embodiment.

FIG. 3 is a flowchart showing an example of the short/open-circuit fault determination processing for the upper arm drive elements QH of the motor control device 10 according to the present embodiment.

As shown in FIG. 3, the short/open-circuit fault determinator 37 of the motor control device 10 first gives a command to block the power supply voltage, a command to block the motor drive current, and a command to stop the gate driving (step S201). The short/open-circuit fault determinator 37 outputs to the blocking manager 32, the command to block the power supply voltage, the command to block the motor drive current, and the command to stop the gate driving. As a result, the power supply voltage blocker 12 and the motor drive current blocker 15 are put into the blocked state, and the gate driver 33 stops the driving. In this state, the short/open-circuit fault determinator 37 performs the short-circuit fault determination processing for the upper arm drive elements QH.

Here, for a motor control device that does not include the power supply voltage blocker 12 or the motor drive current blocker 15, there is no need to block the power supply voltage or the motor drive current.

Then, the short/open-circuit fault determinator 37 acquires a motor rotation speed (step S202). The short/open-circuit fault determinator 37 calculates the motor rotation speed from the electrical angle calculated by the electrical angle calculator 36.

Then, the short/open-circuit fault determinator 37 determines whether or not the motor rotation speed is equal to or less than a threshold Rth (step S203). When the motor rotation speed is equal to or less than the threshold Rth (step S203: YES), the short/open-circuit fault determinator 37 proceeds to step S204. Further, when the motor rotation speed is greater than the threshold Rth (step S203: NO), the short/open-circuit fault determinator 37 returns to step S203.

Here, while the motor 2 is rotating, the motor terminal voltage value increases due to an induced voltage being generated, so that there is a risk of erroneous determination of a short-circuit fault in the short-circuit fault determination processing for the upper arm drive elements QH using the motor terminal voltage value while the motor is rotating. Therefore, the short/open-circuit fault determinator 37 repeats the process of step S203 until the rotation speed becomes equal to or less than the predetermined rotation speed threshold (threshold Rth) at which no erroneous determination occurs.

Further, instead of the process of step S203, a brake mode (a process of driving all of the upper or lower arm drive elements Q for a short period of time) may be used.

In step S204, the short/open-circuit fault determinator 37 determines whether or not the power supply voltage value is equal to or higher than a threshold Vth1. Here, the motor driver 14 includes the smoothing capacitor 141, and the power supply voltage value used in the short-circuit fault determination processing for the upper arm drive elements QH is a voltage value due to the charge accumulated in the smoothing capacitor 141. Therefore, it is possible to perform the short-circuit fault determination even in the short-circuit fault determination processing for the upper arm drive elements QH performed while the power supply voltage is blocked.

Further, when the voltage applied to the smoothing capacitor 141 drops for some reason so that the voltage value detected by the power supply voltage detector 13 becomes equal to or lower than a measurable upper limit of the motor terminal voltage value, even if a short-circuit fault occurs, the motor terminal voltage value does not reach the measurable upper limit thereof, so that normal determination cannot be made. Therefore, in step S204, the short/open-circuit fault determinator 37 confirms whether or not the power supply voltage value has reached the short-circuit fault determinable value.

Here, the threshold Vth1 used for the determination for the power supply voltage value is set to an appropriate value based on the configurations of the DC power supply 11 and the motor terminal voltage detector 18.

When the power supply voltage value is equal to or higher than the threshold Vth1 (step S204: YES), the short/open-circuit fault determinator 37 proceeds to step S205. Further, when the power supply voltage value is lower than the threshold Vth1 (step S204: NO), the short/open-circuit fault determinator 37 proceeds to step S209.

In step S205, the short/open-circuit fault determinator 37 acquires a motor terminal voltage. The short/open-circuit fault determinator 37 acquires the motor terminal voltage detected by the motor terminal voltage detector 18.

Then, the short/open-circuit fault determinator 37 determines whether or not the motor terminal voltage is equal to or higher than a threshold Vth2 and a predetermined period has elapsed (step S206). That is, the short/open-circuit fault determinator 37 determines whether or not a period during which the motor terminal voltage value is equal to or higher than the upper arm short-circuit fault determination threshold (threshold Vth2 or higher) is equal to or longer than the predetermined period. When the motor terminal voltage is equal to or higher than the threshold Vth2 and the predetermined period has elapsed (step S206: YES), the short/open-circuit fault determinator 37 proceeds to step S207. Further, when the motor terminal voltage is equal to or higher than the threshold Vth2 and the predetermined period has not elapsed (step S206: NO), the short/open-circuit fault determinator 37 proceeds to step S208.

In step S207, the short/open-circuit fault determinator 37 determines that there is a short-circuit fault. As a determination result, the short/open-circuit fault determinator 37 outputs to the motor current control calculator 31, an indication that there is a short-circuit fault. After the process of step S207, the short/open-circuit fault determinator 37 ends the short/open-circuit fault determination processing for the upper arm drive elements QH.

Further, in step S208, the short/open-circuit fault determinator 37 determines that there is an open-circuit fault. As a determination result, the short/open-circuit fault determinator 37 outputs to the motor current control calculator 31, an indication that there is an open-circuit fault. After the process of step S208, the short/open-circuit fault determinator 37 ends the short/open-circuit fault determination processing for the upper arm drive elements QH.

Further, in step S209, the short/open-circuit fault determinator 37 performs a process of charging the power supply voltage. The short/open-circuit fault determinator 37 operates the power supply voltage charger 17 to apply charge to the smoothing capacitor 141, thereby increasing the power supply voltage.

Then, the short/open-circuit fault determinator 37 determines whether or not a predetermined period has elapsed (step S210). The short/open-circuit fault determinator 37 determines whether or not an operating period of the power supply voltage charger 17 has exceeded the predetermined period. When the predetermined period has elapsed (step S210: YES), the short/open-circuit fault determinator 37 proceeds to step S211. When the predetermined period has not elapsed (step S210: NO), the short/open-circuit fault determinator 37 returns to step S204.

In step S211, the short/open-circuit fault determinator 37 determines that there is some fault including a short-circuit fault. That is, the short/open-circuit fault determinator 37 determines that some fault including a short-circuit fault in the drive elements Q of the motor driver 14 has occurred. As a determination result, the short/open-circuit fault determinator 37 outputs to the motor current control calculator 31, an indication that there is a short-circuit fault. After the process of step S211, the short/open-circuit fault determinator 37 ends the short/open-circuit fault determination processing for the upper arm drive elements QH.

Here, the predetermined period in step S210 is set to an appropriate value based on the configurations of the smoothing capacitor 141, the power supply voltage charger 17, and the motor driver 14. Further, for a motor control device which does not include the power supply voltage blocker 12, there is no need to perform the above-described processes of steps S209 and S210. In this case, the process of step S211 may be performed when the power supply voltage value is lower than the threshold Vth1 in step S204.

Further, in the above-described short/open-circuit fault determination processing for the upper arm drive elements QH, when any of the upper arm drive elements QH has a short-circuit fault, the power supply voltage applied to the motor driver 14 is applied to the motor terminal voltage to be detected by the motor terminal voltage detector 18 via the short-circuited upper arm drive element QH and the parasitic diode of the switching element of the motor drive current blocker 15. Here, for a motor control device which does not include the motor drive current blocker 15, each upper arm drive element QH and the motor terminal voltage detector 18 may be directly connected.

Further, settings are required such that the measurable upper limit of the motor terminal voltage value is lower than the voltage value of the DC power supply 11, and the motor terminal voltage value in normal times is a value with sufficient margin relative to the measurable upper limit value. The measurable upper limit of the motor terminal voltage is set to, for example, a measurable upper limit of the motor terminal voltage value when a short circuit occurs, which greatly differs from the motor terminal voltage value in normal times, thereby making it possible to perform the short-circuit fault determination using the motor terminal voltage value.

Further, in the short-circuit fault determination processing for the upper arm drive elements QH, when there is no determination of a short-circuit fault, there is either an open-circuit fault or no fault, so that the short/open-circuit fault determinator 37 collectively determines that there is an open-circuit fault and advances the processing.

Next, the details of the above-described processing in step S105 of FIG. 2 will be described with reference to FIG. 4.

Figure 4:
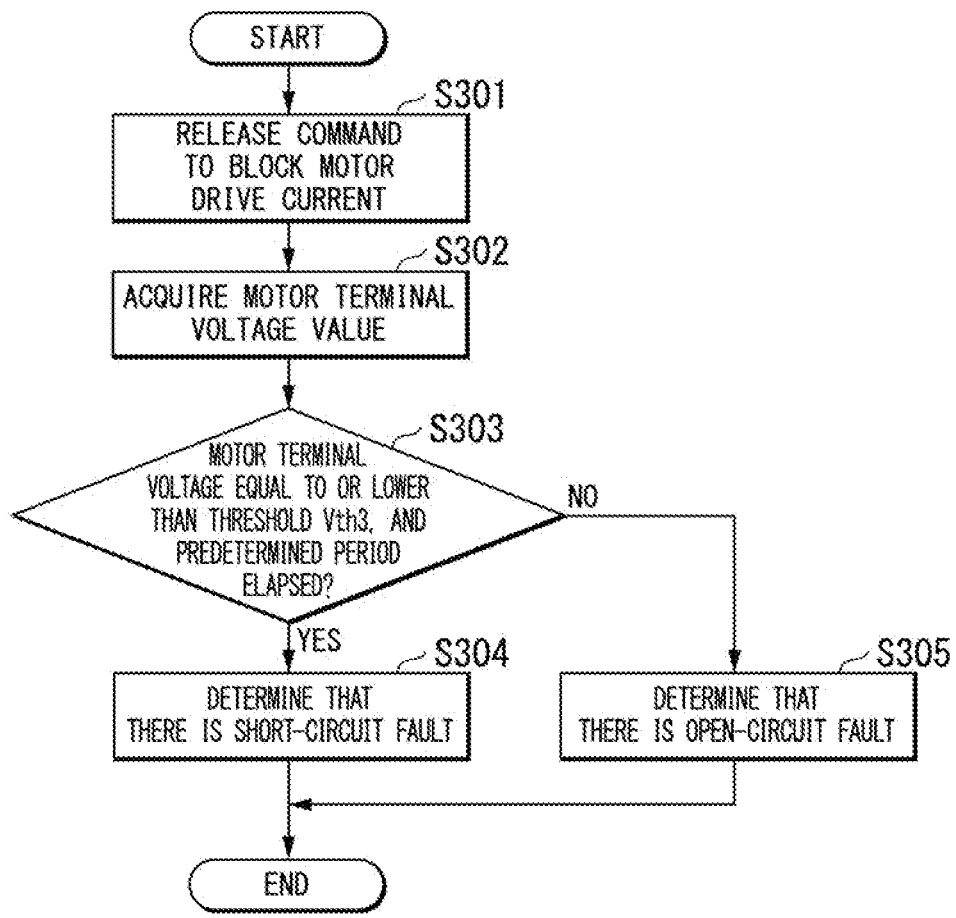
FIG. 4 is a flowchart showing an example of short/open-circuit fault determination processing for lower arm drive elements of the motor control device according to the present embodiment.

FIG. 4 is a flowchart showing an example of the short/open-circuit fault determination processing for the lower arm drive elements QL of the motor control device 10 according to the present embodiment.

As shown in FIG. 4, the short/open-circuit fault determinator 37 of the motor control device 10 first releases the command to block the motor drive current (step S301). The short/open-circuit fault determinator 37 outputs to the blocking manager 32, a command to release the blocking of the motor drive current. As a result, the motor drive current blocker 15 releases the blocked state. In this state, the short/open-circuit fault determinator 37 performs the short-circuit fault determination processing for the lower arm drive elements QL.

Here, in the short-circuit fault determination processing for the lower arm drive elements QL, it is necessary to perform the determination processing while the motor drive current blocker 15 is in a normal state, that is, in an unblocked state, and the gate driver 33 and the motor driver 14 are connected.

In this state, when a lower arm drive element QL is short-circuited, the state becomes equivalent to a state in which the motor terminal is connected to the ground, and the voltage value of the motor terminal, which has been a certain predetermined voltage value, becomes about 0V.

Then, the short/open-circuit fault determinator 37 acquires a motor terminal voltage value (step S302). The short/open-circuit fault determinator 37 acquires the motor terminal voltage detected by the motor terminal voltage detector 18.

Then, the short/open-circuit fault determinator 37 determines whether or not the motor terminal voltage is equal to or lower than a threshold Vth3 and a predetermined period has elapsed (step S303). That is, the short/open-circuit fault determinator 37 determines whether or not a period during which the motor terminal voltage value is equal to or lower than a lower arm short-circuit fault determination threshold (threshold Vth3 or lower) is equal to or longer than a predetermined period. When the motor terminal voltage is equal to or lower than the threshold Vth3 and the predetermined period has elapsed (step S303: YES), the short/open-circuit fault determinator 37 proceeds to step S304. Further, when the motor terminal voltage is equal to or lower than the threshold Vth3 and the predetermined period has not elapsed (step S303: NO), the short/open-circuit fault determinator 37 proceeds to step S205.

In step S304, the short/open-circuit fault determinator 37 determines that there is a short-circuit fault. As a determination result, the short/open-circuit fault determinator 37 outputs to the motor current control calculator 31, an indication that there is a short-circuit fault. After the process of step S304, the short/open-circuit fault determinator 37 ends the short/open-circuit fault determination processing for the lower arm drive elements QL.

Further, in step S305, the short/open-circuit fault determinator 37 determines that there is an open-circuit fault. As a determination result, the short/open-circuit fault determinator 37 outputs to the motor current control calculator 31, an indication that there is an open-circuit fault. After the process of step S305, the short/open-circuit fault determinator 37 ends the short/open-circuit fault determination processing for the lower arm drive elements QL.

As described above, the motor control device 10 according to the present embodiment includes the motor driver 14, the motor terminal voltage detector 18, the drive element fault determinator 34, and the short/open-circuit fault determinator 37. The motor driver 14 is configured to supply electric power to the motor 2 having windings of a plurality of phases. The motor driver 14 includes, for each phase of the plurality of phases, the upper arm drive element QH (QHu, QHv, QHw) and the lower arm drive element QL (QLu, QLv, QLw) which are connected in series. The motor terminal voltage detector 18 is configured to detect a motor terminal voltage value based on a voltage of a motor terminal for each phase of the motor 2. The drive element fault determinator 34 is configured to perform fault determination for the upper arm drive elements QH (upper drive elements) and the lower arm drive elements QL (lower drive elements), based on a voltage value across each drive element Q, and output a result of the fault determination. The short/open-circuit fault determinator 37 is configured to, when the result of the fault determination output by the drive element fault determinator 34 indicates that there is a fault, determine whether the fault is a short-circuit fault or an open-circuit fault, for the upper arm drive elements QH and the lower arm drive elements QL, based on the motor terminal voltage value detected by the motor terminal voltage detector 18.

As a result, the motor control device 10 according to the present embodiment determines whether or not the fault is a short-circuit fault or an open-circuit fault, for the upper arm drive elements QH and the lower arm drive elements QL, using the motor terminal voltage value based on the voltage of the motor terminal for each phase. Therefore, for example, a comparator need not be provided independently for each phase of drive signals, and the configuration can be simplified. Further, the motor control device 10 according to the present embodiment need not use a pre-driver IC having a monitoring function for each drive element Q. Therefore, the motor control device 10 according to the present embodiment can diagnose faults in the drive elements Q with a simple configuration, and achieve the miniaturization and the cost reduction.

Further, in the present embodiment, the short/open-circuit fault determinator 37 is configured to, in the determination processing for the upper arm drive elements QH, determine that the upper arm drive elements QH have the short-circuit fault, when a period during which the motor terminal voltage value is equal to or higher than an upper arm short-circuit fault determination threshold (e.g., threshold Vth2 or higher) is equal to or longer than a predetermined period. Further, the short/open-circuit fault determinator 37 is configured to, in the determination processing for the lower arm drive elements QL, determine that the lower arm drive elements QL have the short-circuit fault, when a period during which the motor terminal voltage value is equal to or lower than a lower arm short-circuit fault determination threshold (e.g., threshold Vth3 or lower) is equal to or longer than a predetermined period.

As a result, the motor control device 10 according to the present embodiment can appropriately perform the determination processing for the upper arm drive elements QH and the determination processing for the lower arm drive elements QL with a simpler configuration.

Further, in the present embodiment, the short/open-circuit fault determinator 37 is configured to, in the determination processing for the upper arm drive elements QH, when determining that the upper arm drive elements QH do not have the short-circuit fault, determine that the upper arm drive elements QH have the open-circuit fault. The short/open-circuit fault determinator 37 is configured to, in the determination processing for the lower arm drive elements QL, when determining that the lower arm drive elements QL do not have the short-circuit fault, determine that the lower arm drive elements QL have the open-circuit fault.

As a result, the motor control device 10 according to the present embodiment can perform the determination of an open-circuit fault by performing the determination of a short-circuit fault, thereby simplifying the processing.

Further, in the present embodiment, the drive element fault determinator 34 is configured to determine that the upper arm drive elements QH have the fault, when a period during which the voltage value across each of the upper arm drive elements QH is not within a predetermined normal voltage range is equal to or longer than a predetermined period, while the upper arm drive elements QH are controlled to be in a conducting state. The drive element fault determinator 34 is configured to determine that the lower arm drive elements QL have the fault, when a period during which the voltage value across each of the lower arm drive elements QL is not within a predetermined normal voltage range is equal to or longer than a predetermined period, while the lower arm drive elements QL are controlled to be in a conducting state.

As a result, the motor control device 10 according to the present embodiment can constantly monitor faults in the drive elements Q and appropriately detect a fault in the drive elements Q by a simple method.

Further, the motor control device 10 according to the present embodiment includes the motor drive current blocker 15. The motor drive current blocker 15 includes a switching element which includes a parasitic diode and is configured to block a power supply from the motor driver 14 to each phase of the motor 2. The short/open-circuit fault determinator 37 is configured to perform the determination processing for the upper arm drive elements QH, based on the motor terminal voltage value applied via the parasitic diode, while the motor drive current blocker 15 blocks the power supply to the motor 2. The short/open-circuit fault determinator 37 is configured to perform the determination processing for the lower arm drive elements QL, based on the motor terminal voltage value, while the switching element of the motor drive current blocker 15 is in a conducting state.

As a result, the motor control device 10 according to the present embodiment can reduce erroneous determinations in the determination processing for the upper arm drive elements QH and the determination processing for the lower arm drive elements QL.

Further, the motor control device 10 according to the present embodiment includes the power supply voltage blocker 12 configured to block a power supply voltage applied to the motor driver 14, the power supply voltage detector 13 configured to detect a voltage applied to the motor driver 14, and the power supply voltage charger 17 configured to forcibly apply a voltage to the motor driver 14. The short/open-circuit fault determinator 37 is configured to perform the determination processing for the upper arm drive elements QH, when the voltage detected by the power supply voltage detector 13 is equal to or higher than a predetermined threshold (for example, threshold Vth1 or higher), while the power supply voltage blocker 12 blocks the power supply voltage. The short/open-circuit fault determinator 37 is configured to, when the voltage detected is lower than the predetermined threshold, cause the power supply voltage charger 17 to forcibly apply the voltage to the motor driver 14, and when the voltage detected reaches the predetermined threshold within a predetermined period, perform the determination processing for the upper arm drive elements QH. The short/open-circuit fault determinator 37 is configured to, when the voltage detected does not reach the predetermined threshold within the predetermined period, determine that the upper arm drive elements QH have the short-circuit fault.

As a result, the motor control device 10 according to the present embodiment includes the power supply voltage blocker 12, the power supply voltage detector 13, and the power supply voltage charger 17, so that the state when performing the determination processing can be kept within a certain range suitable for the determination, and erroneous determinations can be reduced.

Further, in the present embodiment, the short/open-circuit fault determinator 37 is configured to perform the determination processing for the lower arm drive elements QL after performing the determination processing for the upper arm drive elements QH. The short/open-circuit fault determinator 37 is configured to, when determining that the upper arm drive elements QH have the short-circuit fault, not perform the determination processing for the lower arm drive elements QL.

As a result, the motor control device 10 according to the present embodiment performs the determination processing in an appropriate determination order and does not perform unnecessary determination processing, so that the determination processing can be performed more appropriately.

Further, the motor control device 10 according to the present embodiment includes the blocking manager 32 configured to put the motor drive current blocker 15 and the power supply voltage blocker 12 into a blocked state, in response to a blocking command from the short/open-circuit fault determinator 37.

As a result, the motor control device 10 according to the present embodiment can easily change the state for the fault determination processing for the drive elements Q, using the blocking manager 32, and can appropriately diagnose faults in the drive elements Q with a simple configuration.

Further, the motor control device 10 according to the present embodiment includes the gate driver 33 configured to output drive signals to the upper arm drive element QH and the lower arm drive element QL for each phase of the motor driver 14. The blocking manager 32 is configured to output a command to stop the gate driver 33, in response to the blocking command.

As a result, the motor control device 10 according to the present embodiment can stop the gate driver 33 when performing the fault determination processing for the drive elements Q, thereby making it possible to easily stop the motor driver 14.

Further, the motor control device 10 according to the present embodiment includes the motor current control calculator 31 (motor controller) configured to output a drive command value to the gate driver 33 and control driving of the motor 2. The motor current control calculator 31 is configured to stop the driving of the motor 2 when it is determined that the fault is the short-circuit fault in either the determination processing for the upper arm drive elements QH or the determination processing for the lower arm drive elements QL. The motor current control calculator 31 is configured to identify a faulty phase when it is determined that the fault is the open-circuit fault in both the determination processing for the upper arm drive elements QH and the determination processing for the lower arm drive elements QL. Further, the motor current control calculator 31 is configured to, when the faulty phase is one, stop the driving by the faulty phase of the motor 2 and drive the motor 2 by one or more phases other than the faulty phase.

As a result, for example, when an open-circuit fault in a drive element Q is detected in one phase, the motor control device 10 according to the present embodiment drives the motor 2 by one or more phases other than the faulty phase, thereby making it possible to keep driving the motor 2 when the open-circuit fault in the drive element Q occurs.

Further, in the present embodiment, the drive element fault determinator 34 is configured to perform the fault determination before the motor 2 is driven and while the motor 2 is being driven.

As a result, the motor control device 10 according to the present embodiment can appropriately perform fault monitoring and fault determination for the drive elements Q.

Further, the electric power steering device 1 according to the present embodiment includes the motor control device 10 described above, the motor 2, and the torque sensor 22. The motor 2 is configured to assist steering of the steering device 25 (steering). The torque sensor 22 is configured to detect a steering torque of the steering device 25. The motor control device 10 is configured to control driving of the motor 2 according to the steering torque detected by the torque sensor 22.

As a result, the electric power steering device 1 according to the present embodiment has the same effect as that of the motor control device 10 described above, can diagnose faults in the drive elements Q with a simple configuration, and can achieve the miniaturization and the cost reduction.

Further, the motor control method according to the present embodiment is a motor control method for the motor control device 10 including the motor driver 14 and the motor terminal voltage detector 18 described above. The motor control method includes a fault determination step and a short/open-circuit fault determination step. In the fault determination step, the drive element fault determinator 34 performs fault determination for the upper arm drive elements QH and the lower arm drive elements QL, based on a voltage value across each drive element, and outputs a result of the fault determination. In the short/open-circuit fault determination step, when the result of the fault determination output in the drive element fault determination step indicates that there is a fault, the short/open-circuit fault determinator 37 determines whether the fault is a short-circuit fault or an open-circuit fault, for the upper arm drive elements QH and the lower arm drive elements QL, based on the motor terminal voltage value detected by the motor terminal voltage detector 18.

As a result, the motor control method according to the present embodiment has the same effect as that of the motor control device 10 described above, can diagnose faults in the drive elements Q with a simple configuration, and can achieve the miniaturization and the cost reduction.

It should be noted that the present disclosure is not limited to the above embodiment, and can be modified within the scope of the present disclosure.

For example, in the above embodiment, the example in which the motor control device 10 includes the power supply voltage blocker 12 has been described, but the embodiment is not limited to this, and is applicable to a configuration without the power supply voltage blocker 12. In this case, the motor control device 10 need not include the power supply voltage charger 17, and as a processing order, whichever one of the short-circuit fault determination processing for the upper arm drive elements QH and the short-circuit fault determination processing for the lower arm drive elements QL may be performed first.

In the above-described embodiment, the example in which the motor control device 10 includes the motor drive current blocker 15 has been described, but the embodiment is not limited to this, and is applicable to a configuration without the motor drive current blocker 15. In that case, the use of the parasitic diode of the motor drive current blocker 15 becomes unnecessary in the short-circuit fault determination processing for the upper arm drive elements QH, and the control of the blocked state of the motor drive current blocker 15 (command blocking or release the blocking) becomes unnecessary in the short-circuit fault determination processing for the lower arm drive elements QL.

Further, in the above embodiment, part of the configuration of the controller 30 may be provided outside the controller 30. For example, the example in which the gate driver 33 is included in the controller 30 has been described, but the embodiment is not limited to this, and the gate driver 33 may be provided outside the controller 30.

Further, in the above embodiment, the example in which the motor terminal voltage detector 18 is provided outside the controller 30 has been described, but the embodiment is not limited to this, and the motor terminal voltage detector 18 may be included in the controller 30.

Further, in the above embodiment, the example in which the drive elements Q are MOSFETs has been described, but the embodiment is not limited to this, and the drive elements Q may be other semiconductor switching elements such as IGBTs (Insulated Gate Bipolar Transistors).

Here, each configuration of the motor control device 10 and the electric power steering device 1 described above has a computer system inside. Further, a program for realizing the functions of each configuration of the motor control device 10 and the electric power steering device 1 described above may be recorded in a computer-readable recording medium, thereby causing the computer system to read and execute the program recorded in the recording medium to perform the processing of each configuration of the motor control device 10 and the electric power steering device 1 described above. Here, "causing the computer system to read and execute the program recorded in the recording medium" includes installing the program on the computer system. The "computer system" referred to here includes an OS and hardware such as peripheral devices.

Further, the "computer system" may include multiple computer devices connected via a network including communication lines such as the Internet, WAN, LAN, and dedicated lines. Further, the "computer-readable recording medium" refers to portable media such as flexible disks, magneto-optical disks, ROMs and CD-ROMs, and storage devices such as hard disks built into computer systems. Thus, the recording medium storing the program may be a non-transitory recording medium such as a CD-ROM.

Further, the recording medium also includes an internal or external recording medium accessible from a distribution server to distribute the program. Here, the program may be divided into a plurality of programs so that the divided programs are downloaded at different timings and then combined in each configuration of the motor control device 10 and the electric power steering device 1, and different distribution servers may distribute the respective divided programs. Further, the "computer-readable recording medium" includes a medium that retains a program for a certain period of time, such as a volatile memory (RAM) inside a computer system that serves as a server or a client in a case where the program is transmitted via a network. Further, the above-described program may be one for realizing part of the functions described above. Further, the above-described program may be one capable of realizing the functions described above in combination with a program already recorded in the computer system, that is, so-called a difference file (difference program).

Further, part or all of the functions described above may be implemented as an integrated circuit such as an LSI (Large Scale Integration). Each function described above may be individually processorized, and part or all of the functions may be integrated and processorized. Further, the integrated circuit is not limited to an LSI, and may be implemented as a dedicated circuit or a general-purpose processor. Further, when an integrated circuit technology that replaces the LSI appears due to advances in semiconductor technology, an integrated circuit based on that technology may be used.

DESCRIPTION OF SYMBOLS

1: electric power steering device, 2: motor, 10: motor control device, 11: DC power supply, 12: power supply voltage blocker, 13: power supply voltage detector, 14: motor driver, 15: motor drive current blocker, 17: power supply voltage charger, 18: motor terminal voltage detector, 20: angle detector, 21: steering wheel, 22: torque sensor, 23: driving force transmission mechanism, 24: shaft, 25: steering device, 26: wheels, 30: controller, 31: motor current control calculator, 32: blocking manager, 33: gate driver, 34: drive element fault determinator, 35: detected current calculator. 36: electrical angle calculator. 37: short/open-circuit fault determinator, 141: smoothing capacitor. $142u$, $142v$, $142w$: current sensor, QHu, QHv, QHw, QLu, QLv, QLw: drive element

The invention claimed is:

1. A motor control device comprising:
   a motor driver configured to supply electric power to a motor having windings of a plurality of phases, the motor driver comprising, for each phase of the plurality of phases, an upper drive element and a lower drive element which are connected in series;
   a motor terminal voltage detector configured to detect a motor terminal voltage value based on a voltage of a motor terminal for each phase of the motor;
   a drive element fault determinator configured to perform fault determination for the upper drive elements and the lower drive elements, based on a voltage value across each drive element, and output a result of the fault determination; and
   a short/open-circuit fault determinator configured to, when the result of the fault determination output by the drive element fault determinator indicates that there is a fault, determine whether the fault is a short-circuit fault or an open-circuit fault, for the upper drive elements and the lower drive elements, based on the motor terminal voltage value detected by the motor terminal voltage detector wherein
   the short/open-circuit fault determinator is configured to:
   in determination processing for the upper drive elements, determine that the upper drive elements have the short-circuit fault, when a period during which the motor terminal voltage value is equal to or higher than an upper short-circuit fault determination threshold is equal to or longer than a predetermined period, and
   in determination processing for the lower drive elements, determine that the lower drive elements have the short-circuit fault, when a period during which the motor terminal voltage value is equal to or lower than a lower short-circuit fault determination threshold is equal to or longer than a predetermined period.

2. The motor control device of claim 1, wherein
   the short/open-circuit fault determinator is configured to,
   in the determination processing for the upper drive elements, when determining that the upper drive elements do not have the short-circuit fault, determine that the upper drive elements have the open-circuit fault, and
   in the determination processing for the lower drive elements, when determining that the lower drive elements do not have the short-circuit fault, determine that the lower drive elements have the open-circuit fault.

3. The motor control device of claim 1, wherein
   the drive element fault determinator is configured to
   determine that the upper drive elements have the fault, when a period during which the voltage value across each of the upper drive elements is not within a predetermined normal voltage range is equal to or longer than a predetermined period, while the upper drive elements are controlled to be in a conducting state, and
   determine that the lower drive elements have the fault, when a period during which the voltage value across each of the lower drive elements is not within a predetermined normal voltage range is equal to or longer than a predetermined period, while the lower drive elements are controlled to be in a conducting state.

4. The motor control device of claim 1, further comprising:
   a motor drive current blocker comprising a switching element which comprises a parasitic diode and is configured to block a power supply from the motor driver to each phase of the motor,
   wherein the short/open-circuit fault determinator is configured to
   perform determination processing for the upper drive elements, based on the motor terminal voltage value applied via the parasitic diode, while the motor drive current blocker blocks the power supply to the motor, and
   perform determination processing for the lower drive elements, based on the motor terminal voltage value, while the switching element of the motor drive current blocker is in a conducting state.

5. The motor control device of claim 4, further comprising:
a blocking manager configured to put the motor drive current blocker into a blocked state, in response to a blocking command from the short/open-circuit fault determinator.

6. The motor control device of claim 5, further comprising:
a gate driver configured to output drive signals to the upper drive element and the lower drive element for each phase of the motor driver, and
the blocking manager is configured to output a command to stop the gate driver, in response to the blocking command.

7. The motor control device of claim 6, further comprising:
a motor controller configured to output a drive command value to the gate driver and control driving of the motor,
wherein the motor controller is configured to
stop the driving of the motor when it is determined that the fault is the short-circuit fault in either the determination processing for the upper drive elements or the determination processing for the lower drive elements,
identify a faulty phase when it is determined that the fault is the open-circuit fault in both the determination processing for the upper drive elements and the determination processing for the lower drive elements, and
when the faulty phase is one, stop the driving by the faulty phase of the motor and drive the motor by one or more phases other than the faulty phase.

8. The motor control device of claim 1, further comprising:
a power supply voltage blocker configured to block a power supply voltage applied to the motor driver;
a power supply voltage detector configured to detect a voltage applied to the motor driver; and
a power supply voltage charger configured to forcibly apply a voltage to the motor driver,
wherein the short/open-circuit fault determinator is configured to
perform determination processing for the upper drive elements, when the voltage detected by the power supply voltage detector is equal to or higher than a predetermined threshold, while the power supply voltage blocker blocks the power supply voltage,
when the voltage detected is lower than the predetermined threshold, cause the power supply voltage charger to forcibly apply the voltage to the motor driver, and when the voltage detected reaches the predetermined threshold within a predetermined period, perform the determination processing for the upper drive elements, and
when the voltage detected does not reach the predetermined threshold within the predetermined period, determine that the upper drive elements have the short-circuit fault.

9. The motor control device of claim 8, wherein
the short/open-circuit fault determinator is configured to
perform determination processing for the lower drive elements after performing the determination processing for the upper drive elements, and
when determining that the upper drive elements have the short-circuit fault, not perform the determination processing for the lower drive elements.

10. The motor control device of claim 8, further comprising:
a blocking manager configured to put the power supply voltage blocker into a blocked state, in response to a blocking command from the short/open-circuit fault determinator.

11. The motor control device of claim 1, wherein
the drive element fault determinator is configured to perform the fault determination before the motor is driven and while the motor is being driven.

12. An electric power steering device comprising:
the motor control device of claim 1;
a motor configured to assist steering of a steering device; and
a torque sensor configured to detect a steering torque of the steering device,
wherein the motor control device is configured to control driving of the motor according to the steering torque detected by the torque sensor.

13. A motor control method for a motor control device, comprising:
supplying electric power from a motor driver to a motor having windings of a plurality of phases, the motor driver comprising, for each phase of the plurality of phases, an upper drive element and a lower drive element which are connected in series;
detecting a motor terminal voltage value based on a voltage of a motor terminal for each phase of the motor;
performing fault determination for the upper drive elements and the lower drive elements, based on a voltage value across each drive element;
outputting a result of the fault determination;
when the result of the fault determination indicates that there is a fault, determining whether the fault is a short-circuit fault or an open-circuit fault, for the upper drive elements and the lower drive elements, based on the motor terminal voltage value;
in determination processing for the upper drive elements, determining that the upper drive elements have the short-circuit fault, when a period during which the motor terminal voltage value is equal to or higher than an upper short-circuit fault determination threshold is equal to or longer than a predetermined period; and
in determination processing for the lower drive elements, determining that the lower drive elements have the short-circuit fault, when a period during which the motor terminal voltage value is equal to or lower than a lower short-circuit fault determination threshold is equal to or longer than a predetermined period.

14. The motor control method of claim 13, further comprising:
in the determination processing for the upper drive elements, when determining that the upper drive elements do not have the short-circuit fault, determining that the upper drive elements have the open-circuit fault, and
in the determination processing for the lower drive elements, when determining that the lower drive elements do not have the short-circuit fault, determining that the lower drive elements have the open-circuit fault.

15. The motor control method of claim 13, further comprising:
determining that the upper drive elements have the fault, when a period during which the voltage value across each of the upper drive elements is not within a predetermined normal voltage range is equal to or longer than a predetermined period, while the upper drive elements are controlled to be in a conducting state, and determining that the lower drive elements have the fault, when a period during which the voltage value across each of the lower drive elements is not within a predetermined normal voltage range is equal to or longer than a predetermined period, while the lower drive elements are controlled to be in a conducting state.

16. The motor control method of claim 13, further comprising:
performing determination processing for the upper drive elements, when a detected voltage applied to the motor driver is equal to or higher than a predetermined threshold, while blocking a power supply voltage applied to the motor driver;
when the detected voltage is lower than the predetermined threshold, forcibly applying a voltage to the motor driver, and when the detected voltage reaches the predetermined threshold within a predetermined period, performing the determination processing for the upper drive elements; and
when the detected voltage does not reach the predetermined threshold within the predetermined period, determining that the upper drive elements have the short-circuit fault.

17. The motor control method of claim 16, further comprising:
performing determination processing for the lower drive elements after performing the determination processing for the upper drive elements; and
when determining that the upper drive elements have the short-circuit fault, not performing the determination processing for the lower drive elements.

18. The motor control method of claim 13, further comprising:
stopping driving of the motor when it is determined that the fault is the short-circuit fault in either determination processing for the upper drive elements or determination processing for the lower drive elements;
identifying a faulty phase when it is determined that the fault is the open-circuit fault in both the determination processing for the upper drive elements and the determination processing for the lower drive elements; and
when the faulty phase is one, stopping the driving by the faulty phase of the motor and driving the motor by one or more phases other than the faulty phase.

* * * * *